United States Patent [19]

Ignatjev

[11] 4,191,167
[45] Mar. 4, 1980

[54] SOLAR ENERGY FLUID HEATER
[76] Inventor: Vladimir Ignatjev, 39 Ledgewood Dr., Norwalk, Conn. 06850
[21] Appl. No.: 807,004
[22] Filed: Jun. 16, 1977

Related U.S. Application Data

[63] Continuation-in-part of Ser. No. 786,082, Apr. 11, 1977, abandoned.
[51] Int. Cl.² ............................................. F24J 3/02
[52] U.S. Cl. .................................................. 126/417
[58] Field of Search ............................ 273/58 B, 227; 4/172.14, 172.12; 126/270, 271; 203/DIG. 1

[56] References Cited
U.S. PATENT DOCUMENTS

| | | | |
|---|---|---|---|
| 2,716,837 | 9/1955 | King | 273/58 B |
| 2,776,139 | 1/1957 | Blamey, Jr. et al. | 273/58 B |
| 2,952,460 | 9/1960 | Ellis | 273/58 B |
| 3,077,190 | 2/1963 | Allen | 126/271 |
| 3,159,554 | 12/1964 | Mount | 126/271 |
| 3,373,464 | 3/1968 | Ausnit | 4/172.12 |
| 3,436,315 | 4/1969 | Ackerman | 203/DIG. 1 |
| 3,872,522 | 3/1975 | Bennett et al. | 4/172.12 |
| 3,985,116 | 10/1976 | Kapany | 126/270 |
| 4,028,750 | 6/1977 | Gustafsson | 4/172.12 |
| 4,077,849 | 3/1978 | Ziehm, Jr. | 126/271 |

FOREIGN PATENT DOCUMENTS

| | | | |
|---|---|---|---|
| 236337 | 11/1961 | Australia | 126/271 |
| 649026 | 1/1951 | United Kingdom | 122/367 PF |

*Primary Examiner*—Larry I. Schwartz
*Attorney, Agent, or Firm*—Robert A. Green

[57] ABSTRACT

The solar energy absorber and fluid heater comprises a plurality of apertured hollow black balls disposed in a container of fluid to be heated, for example, as a layer along the bottom surface thereof. The sun's rays pass through the fluid and are absorbed by the surfaces and walls of the balls. The heated balls produce a flow of heated water throughout the container to heat all of the fluid therein. The solar energy absorber may also be a flat, dark colored plate which itself may carry apertured, fluid-receiving chambers.

5 Claims, 8 Drawing Figures

SOLAR ENERGY FLUID HEATER

CROSS-REFERENCE TO RELATED APPLICATIONS

This application is a continuation-in-part of application Ser. No. 786,082, filed Apr. 11, 1977 now abandoned.

BACKGROUND OF THE INVENTION

Considerable activity is presently going on in the field of heating fluids by solar energy, and most apparatus suggested for performing such a function is relatively bulky and undesirably expensive. The present invention provides a simple, inexpensive arrangement for heating fluids by means of solar energy.

DESCRIPTION OF THE PREFERRED EMBODIMENTS

The invention may be used to heat any type of fluid in any type of container. One particularly desirable use, which is described, is the heating of water in a swimming pool.

Figure 1:
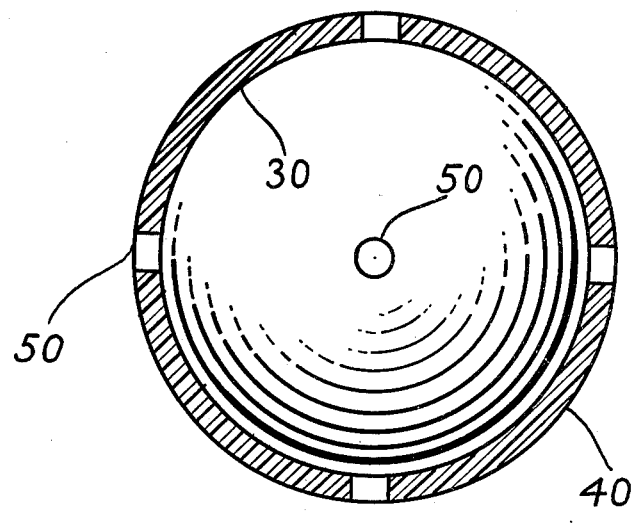
FIG. 1 is a sectional view of apparatus embodying the invention.
Figure 2:
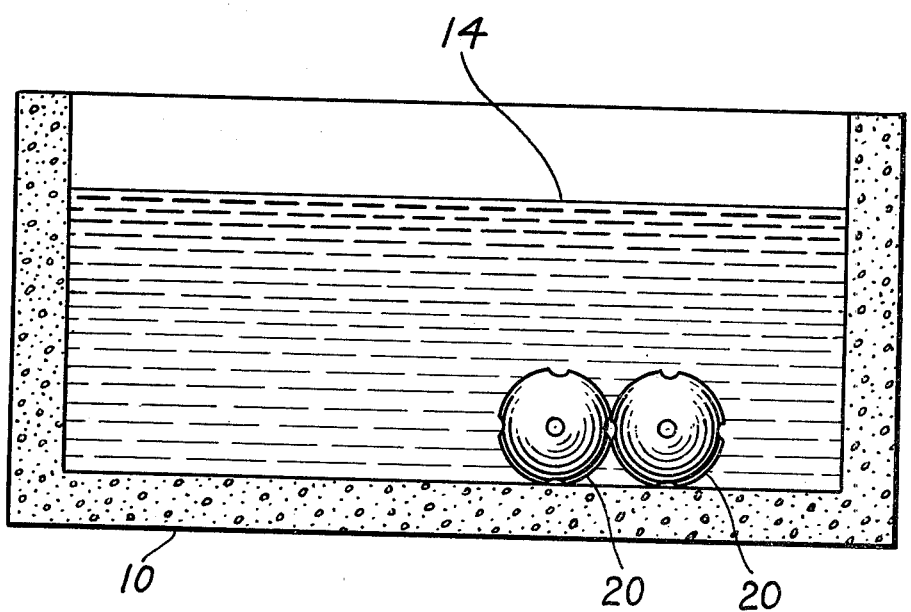
FIG. 2 is a sectional elevational view of apparatus for use with the apparatus of FIG. 1.

Referring to the drawing, FIG. 1 shows a swimming pool 10 filled with water 14, and, according to the invention, a layer of balls 20 is provided on the floor of the swimming pool. In this case, the balls are preferably hollow and have resilient walls, and are preferably made of rubber so that they can be stepped on comfortably. The balls have black or dark inner and outer surfaces 30 and 40 and a plurality of apertures 50 in their walls which may have any suitable thickness. In fact, the walls of the balls are preferably completely black throughout their thickness, for ease of manufacture.

In operation of the invention, solar energy strikes the outer surfaces 40 of the balls and is absorbed to generate heat therein. Some heat radiates into the water from the walls of the balls, and some heat is conducted through the walls of the balls to the water therein and through the water to the rear, bottom surfaces of the balls. The water in the balls is thus heated by the walls. As the water is heated, it becomes lighter and rises and flows out of the balls through the upper apertures 50 therein, and, simultaneously, colder water falls and enters the balls through holes in the lower portions thereof. This water is now heated, and eventually all of the water in the pool is heated. In addition, warmed water flows upwardly along the outer surfaces of the balls.

It is noted that solar energy absorbers in the shape of balls or spheres have the advantage of absorbing a constant amount of solar energy over a wide range of angles of the sun.

Various modifications of the apparatus described will occur to those skilled in the art. For example, it is clear that heat-absorbing members of any size and shape may be used in practicing the invention; the described spherical construction is not required.

It is noted that the specific gravity of the fluid containers, of whatever shape, is properly selected to control their position in the fluid in which they are immersed. Under some circumstances, it may be desirable to have the fluid containers on the surface of the fluid, on the bottom, and/or dispersed throughout the fluid.

Figure 3:
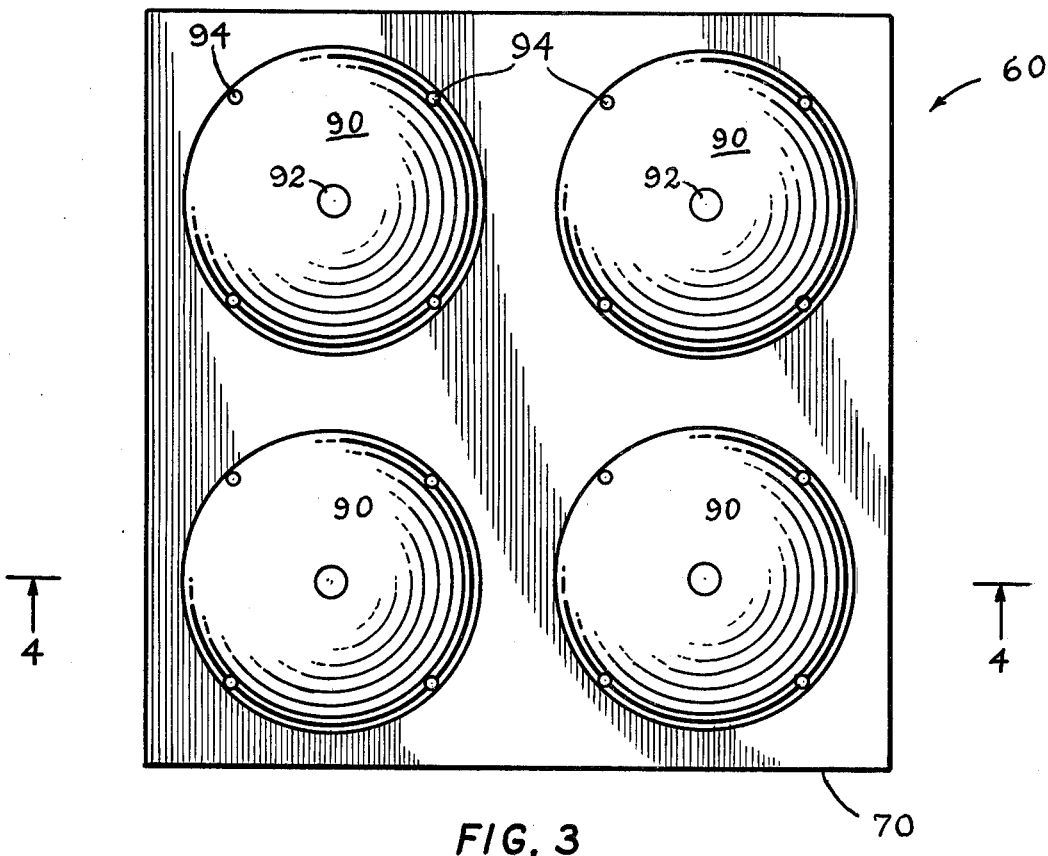
FIG. 3 is a plan view of a modification of the invention.
Figure 4:
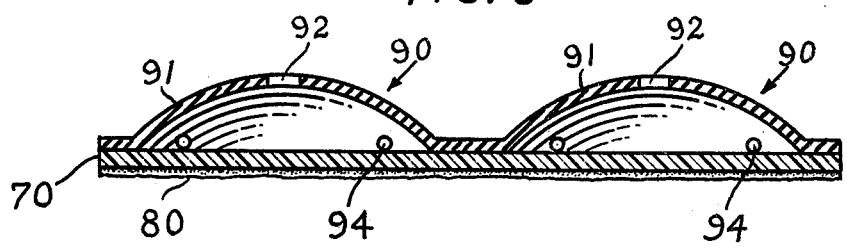
FIG. 4 is a sectional view along the lines 4—4 in FIG. 3.
Figure 5:
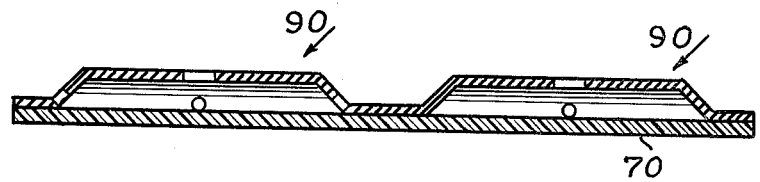
FIG. 5 is a sectional view of a modification of the invention.

In a modification of the invention illustrated in FIGS. 3 and 4, a solar energy absorbing device 60 comprises a support base or plate 70 of any suitable material which carries a layer of adhesive 80 on its lower surface so that the plate can be secured to the floor of a water-filled chamber, swimming pool, or the like. The layer of adhesive may not be required in all situations. The plate 70 carries on its upper surface a plurality of fluid-receiving chambers 90 having almost spherical cross-sections as shown in FIG. 3 or generally frusto-pyramidal cross-sections as shown in FIG. 5. Other cross-sections may also be used. The fluid-receiving chambers 90 are formed by means of strips or sheets, or layers 91 of rubber or the like formed in the desired shape and secured to the top surface of plate 70. For convenience, the devices 60 may be made in relatively small tiles, each having four chambers 90, or they may be made in other larger sizes.

The plate 70 and the walls 91 of the chambers 90 are preferably black or at least a dark color to provide optimum heat absorption.

According to the invention, the chambers 90 are provided with one outlet hole 92 at the center of the chamber wall 91 which is the highest point of the chamber above plate 70. The chambers are also provided with a plurality of inlet holes 94 disposed generally along their lower margins adjacent to plate 70. The holes permit fluid to enter the chambers 90.

Figure 6:
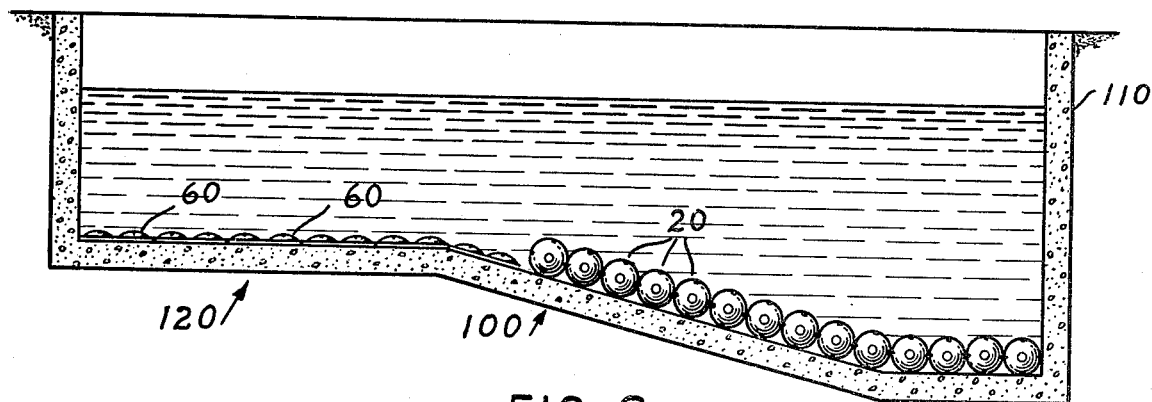
FIG. 6 is a sectional view of a swimming pool using the invention.

In use, the absorber devices or tiles 60 are distributed over all or a portion of the bottom of a swimming pool or the like, to be heated, and the heating operation takes place generally as described above. In an optimum arrangement, shown in FIG. 6, the balls or spheres 20 are distributed over the floor of the deep portion 100 of a pool 110, and the tiles 60 are distributed over the flatter shallow portion 120 of the pool.

In one embodiment of the invention, the walls 91 of the chambers 90 had a thickness of about 1/16 inch, the chambers had a height of about 0.3 inch, and an outside diameter of about 1¾ inches, the holes 92 had a diameter of about ¼ inch, and the holes 94 has a diameter of about ⅛ inch each. The total area of the lower inlet holes 94 generally equals the area of the outlet hole 92 in each chamber.

Figure 7:
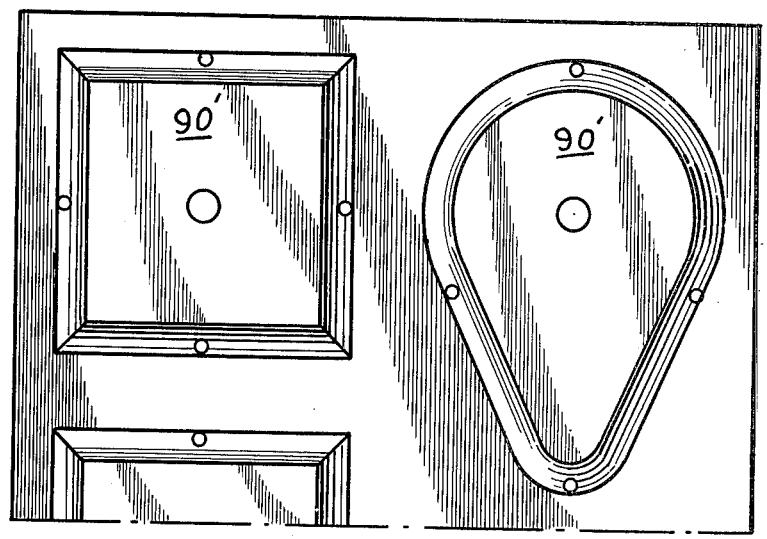
FIG. 7 is a plan view of a modification of the invention.

As illustrated in FIG. 7, a tile may be provided having chambers 90' of various ornamental shapes as desired. In addition, a flat, black or dark-colored plate or tile 70, without chambers 90, may be used to absorb heat and heat a fluid-filled container, even though such tiles may be less efficient than those with chambers 90.

Figure 8:
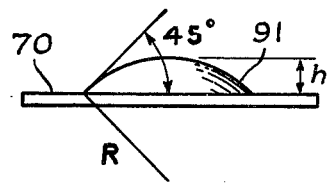
FIG. 8 is a side elevational view of a portion of the apparatus of FIG. 3 illustrating dimensional features thereof.

For optimum heat collection as the sun travels across the sky during the day, as illustrated in FIG. 8, the top curved wall 91 of each chamber 90 defines a cross-section which is smaller than a hemisphere and the wall is a portion of a sphere having the radius $R=\pi h$ where h is the height of the top surface of the wall 91 above the plate 70. In addition, the angle which the wall 91 forms at the plate 70 is about 45°.

What is claimed is:

1. Apparatus for absorbing solar energy and heating fluid therewith comprising a container of fluid through which the sun's rays can pass, said container having a bottom wall, in said container, a plurality of thin-walled, dark-colored, hollow members, each having a plurality of apertures in its wall through which fluid can flow into and out of the interior thereof, said members being positioned to receive the sun's rays and to become heated thereby and to thereby heat the fluid in said container by contact and by radiation, said hollow members each being secured to a plate which is seated on said bottom wall and provides a thermal insulating action between said bottom wall of said container and said hollow member.

2. The apparatus defined in claim 1 wherein each hollow member and the plate to which it is secured comprise an integral structural unit.

3. The apparatus defined in claim 1 wherein each said plate carries adhesive by which it can be secured to said bottom wall of said container.

4. The apparatus defined in claim 1 wherein each said hollow member has a curved upper surface which faces the sun and provides optimum absorption of heat from the sun as the sun travels across the sky.

5. A swimming pool comprising a water-filled enclosure having a floor including a relatively shallow flat portion and a sloped, deeper portion, a plurality of black, apertured balls on said sloped portion and a plurality of flat black plates on said flat portion, said plates carrying apertured chambers through which water can flow.

* * * * *